United States Patent [19]
Grosboll et al.

[11] 3,875,055
[45] Apr. 1, 1975

[54] APPARATUS AND METHOD

[75] Inventors: Martin P. Grosboll, Homewood; Robert R. Edison, Olympia Fields, both of Ill.

[73] Assignee: Atlantic Richfield Company, Los Angeles, Calif.

[22] Filed: Oct. 9, 1973

[21] Appl. No.: 404,471

[52] U.S. Cl.................. 210/73, 210/266, 210/287, 23/288 R
[51] Int. Cl............................................. B01d 29/42
[58] Field of Search ....... 210/65, 73, 266, 287, 289, 210/290; 23/288 R, 289

[56] References Cited
UNITED STATES PATENTS

| | | | |
|---|---|---|---|
| 2,276,340 | 3/1942 | Prickett et al. | 23/288 R |
| 3,469,990 | 9/1969 | Mackler | 23/289 X |
| 3,702,238 | 11/1972 | Armistead et al. | 23/288 R |
| 3,737,039 | 6/1973 | Hias | 210/289 X |
| 3,792,981 | 2/1974 | Hettick et al. | 23/288 R |

*Primary Examiner*—John Adee
*Attorney, Agent, or Firm*—Frank J. Uxa

[57] ABSTRACT

An apparatus for removing particulate impurities from a fluid stream flowing into a bed of discrete solid elements comprising a plurality of hollow elongated basket members each adapted to be generally aligned along its longitudinal axis with the direction of fluid flow and to extend along a substantial portion of its length into the bed of solid elements, provided that at least a portion of the fluid is allowed to flow directly into the top opening of each basket member. It is essential that one-half (½) the average of the closest distances between closest basket members multiplied by the average longitudinal distance of the basket member sidewalls of open mesh construction in the bed of solid elements be at least about 0.75 ft.²

A method for removing particulate impurities from a fluid stream flowing into a bed of discrete solid elements is also disclosed.

19 Claims, 2 Drawing Figures

PATENTED APR 1 1975 3,875,055

APPARATUS AND METHOD

The present invention relates to an apparatus and method for removing particulate impurities from a fluid stream flowing into a bed of discrete solid elements, and more particularly, relates to an improved basket design which facilitates the removal of particulate impurities from fluid streams flowing into a bed of catalyst particles.

In any process which involves conducting a stream of fluid material through a bed of discrete solid elements the cycle life of the bed itself, for example, a bed of catalyst particles in a chemical reaction zone, i.e., reactor, is a function of the amount of particulate impurities which are entrained in the fluid stream. Since the particulate impurities are filtered out of the stream by the layer of bed material through which the stream enters, when a sufficiently large amount of these particulate impurities accumulate at or near the surface of the bed through which the stream enters, the pressure drop across the bed increases to a level which no longer permits acceptable operation of the bed. Hence, the reactor or the like containing the bed must be shut down.

It has heretofore been proposed to overcome this problem and extend the cycle life of a bed of catalytic particles or the like by providing the bed of solid elements with a great many cylindrical wire mesh containers called "trash baskets," which are placed in the bed with open ends at or near the surface of the bed through which the fluid stream enters. Additionally, some of these prior art "trash baskets" also include flow reversal means to restrict the flow of fluid directly into the top openings of the baskets. These prior art devices do have disadvantages. For example, the prior art "open ended" baskets are not very effective in increasing the cycle life of a bed of solid elements. Also, the flow reversal means of certain of these prior art baskets actually may add to the pressure drop across the bed of solid elements. In addition, these flow reversal means may add to the complexity and fragility of the equipment associated with a bed of solid elements.

Therefore, it is an object of the present invention to provide an improved apparatus for removing particulate impurities from a fluid stream flowing into a bed of discrete solid elements.

Another object of the present invention is to provide an improved apparatus for increasing the cycle life of a bed of discrete solid elements which has a fluid stream flowing therethrough.

A further object of the present invention is to provide an improved method for removing particulate impurities from a fluid stream flowing into a bed of discrete solid elements.

A still further object of the present invention is to provide an improved method for increasing the cycle life of a bed of discrete solid elements which has a fluid stream flowing therethrough. Other objects and advantages will become apparent hereinafter.

An improved apparatus for removing particulate impurities from a fluid stream, preferably comprising a liquid-vapor mixture, flowing, preferably in a generally downwardly direction, into a bed of discrete solid elements has not been discovered. The apparatus comprises a plurality, i.e., at least two, of hollow elongated, preferably cylindrical, basket members each adapted to be generally aligned along its longitudinal axis with the direction of fluid flow and to extend along a substantial portion of its length into the bed of solid elements, provided that at least a portion of the fluid is allowed to directly enter the top opening of each of the basket members. Each of the basket members is defined by a bottom end wall, preferably of open mesh construction, and sidewalls, at least a portion of which being of open mesh construction, adjacent to the bottom end. It is an essential feature of the present apparatus that one-half the average of the closest distances between closest basket members multiplied by the average longitudinal distance of the sidewalls of open mesh construction in the bed of solid elements is at least about 0.75 ft.$^2$, preferably in the range from about 1.0 ft.$^2$ to about 10 ft.$^2$ and more preferably in the range from about 1.2 ft.$^2$ to about 4.0 ft.$^2$. It is preferred that the cross-sectional area of the top opening of each basket member be at least about 0.5 in.$^2$, more preferably, from about 1 in.$^2$ to about 600 in.$^2$.

By the term "the average of the closest distances between closest basket members" is meant the arithmetic average of the shortest straight line distances between each basket member and its nearest neighboring basket member. Thus, the number of distances to be averaged equals the number of basket members extending into the bed of solid elements. If, as is preferred, the basket members are substantially equidistantly spaced across the cross-section of the bed of solid elements, each closest distance between closest basket member is substantially the same. In any event, the average of the closest distances between closest basket members may be determined measuring the shortest straight line distance between each basket member and its nearest neighboring basket member, adding up all such shortest straight line distances and dividing the resulting sum by the total number of basket members.

In order to provide that at least a portion of the fluid be allowed to directly enter the top opening of each of the basket members, the basket members of the present apparatus are not associated with means, for example, fluid flow reversal means and/or other means, which restrict substantially all of the fluid from flowing directly into the top openings of the basket members.

Although the present apparatus is useful for removing particulate impurities from any fluid stream, e.g., liquid, vapor and mixtures thereof, it finds particular usefulness when used to remove particulate impurities from fluids comprising mixtures of liquid, more preferably a major amount by weight of liquid, and vapor.

An improved method for removing particulate impurities from a fluid stream flowing, preferably in a generally downwardly direction, into a bed of solid elements using the present apparatus has also been discovered. This method comprises conveying the flowing fluid stream, preferably in a generally downwardly direction, toward a surface of the bed of solid elements having disposed therein the present apparatus.

The present invention finds a particularly advantageous application in connection with increasing the cycle life of a bed of discrete solid elements comprising catalyst particles with which a fluid stream, preferably flowing in a generally downward direction, is to be contacted during the carrying out of any one of a multitude of well known chemical reactions. For example, the apparatus of the invention may be employed in a catalytic reactor vessel utilized to contact a downwardly flowing stream of liquid hydrocarbon material in admixture with gaseous hydrogen with a conventional hydroforming or reforming catalyst. Although the present invention will be described with reference to a specific embodiment involving a bed of discrete solid elements comprising catalytic material of the foregoing type, it is to be understood that the principles of the invention may be equivalently utilized in conjunction with other processes wherein a fluid stream is to be contacted with a bed of discrete particulate material.

Figure 1:
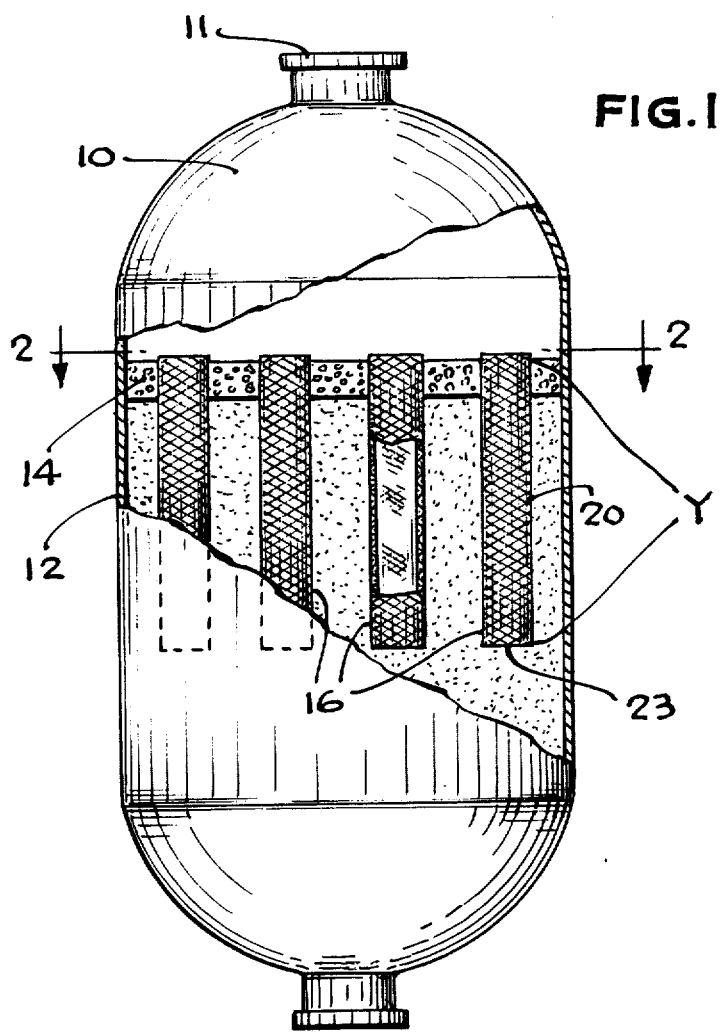
FIG. 1 is a front elevation view, partially in section, of a catalytic reactor and bed of discrete solid elements comprising catalyst particles equipped with an improved apparatus according to the present invention.
Figure 2:
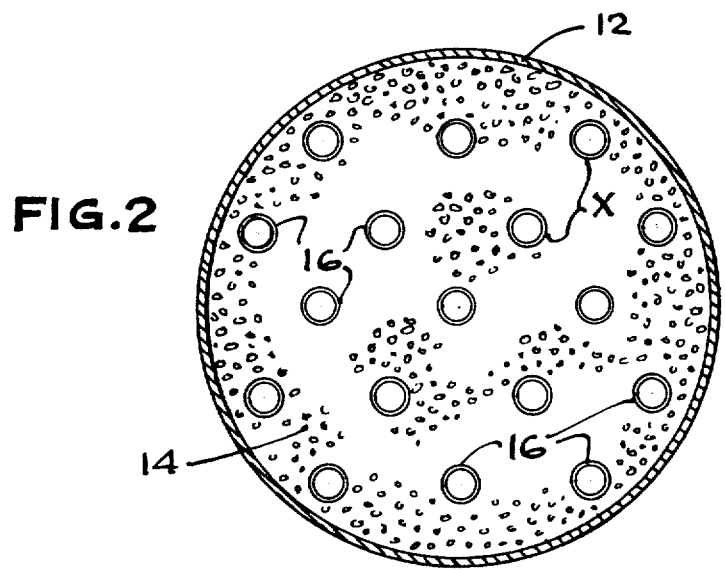
FIG. 2 is a top view of FIG. 1 taken along the line 2—2 of FIG. 1.

Referring now to the drawings, in FIG. 1 there is illustrated a conventional catalytic reactor vessel 10 containing a packed bed comprising finely divided catalytic material 12, and a relatively thin layer of essentially catalytically inert alumina balls 14 covering the top surface of the catalytic material 12. One function of the alumina balls 14 is to aid in securing the bed of catalytic material 12 in place. Spaced at substantially equidistant intervals across the top surface area of the alumina balls 14 are a plurality of basket members 16, the placement of which may be envisioned better by reference to FIG. 2 of the drawings. The basket members 16 are inserted into the catalytic material 12 and extend thereinto over a substantial portion of their length, leaving only a short portion extending above the surface of the catalytic material 12 and its covering layer of alumina balls 14. It is essential that one-half the average of the closest distance between closest basket members 16, designated X in FIG. 2, multiplied by the average longitudinal distance of the sidewalls of open mesh construction in the bed of alumina balls 14 and catalyst material 12, designated Y in FIG. 1, be at least about 0.75 feet$^2$, preferably in the range from about 1.0 feet$^2$ to about 10 feet$^2$, more preferably from about 1.2 feet$^2$ to about 4.0 feet$^2$.

Each basket member 16 is defined essentially by sidewalls 20 extending from top to bottom and a bottom wall 23, with the top of each basket member 16 remaining generally open. The sidewalls 20 are fabricated from an open mesh type material, such as woven wire or the like, although a minor portion thereof may be of solid construction. The bottom wall 23 may be of solid construction, although open mesh construction is preferred. The size of the openings in the mesh is generally smaller than the average size of the discrete solid elements making up the bed which are in contact with the mesh. In a preferred embodiment, the size of the mesh openings are sufficiently large to allow substantially all of the particulate matter in the flowing fluid stream is capable of passing through these mesh openings. In certain instances, a supporting basket of relatively heavy construction (not shown) is used in conjunction with each basket member 16 to provide added rigidity and/or strength. In a preferred embodiment, the area of the openings in the mesh comprise from about 20% to about 85%, more preferably from about 40% to about 85%, of the area encompassed by the open mesh construction. In other words, the open mesh used to construct the basket members 16 of the present invention preferably comprise from about 20% to about 85%, more preferably from about 40% to about 85%, open area.

In operation, a fluid stream, for example, a stream of liquid, preferably a major amount by weight of liquid, and is conducted into the catalytic reactor 10 through the entrance port 11 thereof and is directed downwardly toward the catalytic material 12. A portion of this fluid stream flows directly into the top opening of each basket member 16. The remaining portion of the fluid stream enters the catalytic material 12 by entering the exposed surface of the alumina balls 14. The portion of the alumina balls 14 and catalytic material 12 at or near the exposed top surface of the alumina balls 14 are initially clean and, therefore, serve to remove entrained particulate impurities from the fluid stream so entering the catalytic material during at least the initial stages of operation. After the reactor 10 has been in operation for a period of time, the portion of the alumina balls 14 and catalytic material 12 at or near the exposed surface of the alumina balls 14 begins to become fouled with the impurities collected, thereby increasing the pressure drop experienced by the fluid as it passes directly into the alumina balls 14. As this pressure drop increases, a greater portion of the fluid stream enters the basket members 16. The particulate impurities in the portion of the fluid stream which enters the top openings of basket members 16 are removed along that portion of the alumina balls 14 and catalyst material 12 surrounding the open mesh construction of the sidewalls 20 and, preferably, the bottom wall 23. Thus, effective use is made of both the alumina balls 14 and catalyst material 12 surrounding the open mesh construction of basket members 16 to remove entrained particulate impurities from the fluid stream, thereby resulting in a maximal increase in the cycle life of the catalytic material 12.

The improved "trash basket" design of the present invention is, as heretofore mentioned, most preferably employed within the context of a catalytic reactor, and in general, the improved basket design can be employed in any conventional reactor. Such reactors typically have cross-sectional areas, preferably circular, ranging from about 0.5 Ft.$^2$ or less to about 170 Ft.$^2$ or more, preferably from about 5 Ft.$^2$ to about 150 Ft.$^2$ and from about 5 Ft. or less to about 125 Ft. or more, preferably from about 10 Ft. to about 70 Ft., in length. The particles used to form the bed within such a reactor may have any suitable geometry, e.g., spheres, cylinders, pills, tabletts, irregularly shaped particles, etc. Preferably, the maximum linear dimension of the particles does not exceed about 3% of the reactor diameter. Typically, such catalyst particles have a minimum dimension of at least about 0.01 in. and a maximum dimension up to about ½ in. or 1 in. or more. The "trash basket" devices of the present invention have particular utility when employed in reactor systems which carry out the catalytic chemical conversion of hydrocarbons such as that involved in petroleum refining and petrochemical processing and the like. Included among the conventional and well known hydrocarbon chemical reactions which may be promoted by such catalyst and in which the present apparatus and methods may be useful are oxidation, hydrosulfurization, hydrocracking, cracking, reforming, hydrogenation, polymerization, alkylation, isomerization, disproportionation, and the like. Typical operating conditions and catalyst compositions employed in each of these catalytic reaction systems are well known to those skilled in the art and may be varied to meet the requirements of the individual hydrocarbon process. For this reason, an extensive list of reaction conditions and catalyst compositions is not included herein. However, to illustrate, typical examples of hydrocarbon hydrodesulfurization catalysts comprise a support and any one or more of the transition metals, metal oxides, metal sulfides, or other metal salts which are known to catalyze hydrodesulfurization. Hydrocarbon reforming catalysts typically comprise at least one platinum group metal on a support. Typical examples of hydrocracking catalysts include crystalline metallic alumino-silicate zeolites, having a platinum group metal, e.g., platinum or palladium, deposited thereon or composited therewith. Hydrogenation catalysts may comprise at least one Group VIII metal of the Periodic Table, such as nickel, cobalt, iron, the platinum group metals such as palladium, platinum, iridium, or ruthenium and mixtures thereof on a suitable support. Suitable carriers or supports for these catalysts may comprise materials such as silica, alumina, zirconia, titania, magnesia, boria, silica-alumina, silica-magnesia, acidic clays, halided alumina and the like. Mixtures of more than one of such materials may be used in these catalysts.

The following examples illustrate the improved apparatus and method of the present invention.

A hydrocarbon hydrotreating reactor vessel having a 4.5 foot inside diameter and a length of 11 feet contained a bed of 1/16 inch diameter conventional hydrotreating catalyst particles. A 4 inch thick layer of alumina balls having a diameter of approximately ½ inch was placed atop this catalyst material. This reactor system was used to process about 86,000 lbs./hr. of a generally downwardly flowing stream comprising a hydrogen-hydrocarbon liquid-vapor mixture containing about 85% by weight of liquid at a reactor inlet pressure of about 855 psig. and a reactor inlet temperature of about 650°F.

This reactor system was equipped with an apparatus comprising 14 cylindrical basket members, having a solid bottom wall and side walls of open mesh construction, evenly spaced across the top surface of the alumina balls. The mesh holes were square and were 0.168 inch in circumference. The open mesh material comprised about 25.4% open area. The top opening of each basket member was 6 inches in diameter. Each basket member was 18 inches in length with essentially the entire length below the top surface of the alumina balls. Therefore, one-half the average of the closest distances between closest basket members multiplied by the average longitudinal distance of the side walls of open mesh construction in the bed of solid elements was 0.49 ft.$^2$.

The reactor system was used to process the above stream for four months after which period of time the pressure drop across the bed of solid elements had increased by 45 psi.

These basket members were replaced by an apparatus according to the present invention which comprised 7 cylindrical basket members having bottom wall and sidewalls of open mesh construction evenly spaced across the top surface of the alumina balls. The mesh holes of the open mesh material used were square and had an average circumference of 0.232 inch. This open mesh material comprised about 48.4% open area. The top opening of each basket member was 8 inches in diameter. Each basket member was 36 inches in length with essentially the entire length below the top surface of the alumina balls. In this instance, one-half the average of the closest distances between closest basket member multiplied by the average longitudinal distance of the sidewalls of open construction in the bed of solid elements was 1.25 ft.$^2$.

The reactor system modified as noted above was used to process the above-described stream. After 5 months, the pressure drop across the bed of solid elements had increased by only 5 psi. and after 7 months had increased by only 10 psi.

These examples clearly indicate that the apparatus of the present invention provides a more efficient means of removing particulate impurities from a stream flowing into a bed of solid elements.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. An apparatus for removing particulate impurities from a fluid stream flowing in a generally downwardly direction into a bed of discrete solid elements comprising catalyst particles, said apparatus comprising a plurality of hollow elongated basket members each adapted to be generally aligned along its longitudinal axis with the direction of fluid flow and to extend along a substantial portion of its length into said bed of solid elements, provided that atleast a portion of said fluid is allowed to directly enter the top opening of each said basket member, each said top opening being essentially at or above the level of said bed of solid elements, each said basket member being defined by a bottom end wall, and sidewalls at least a portion of which are of open mesh construction adjacent to said bottom end, wherein one-half the average of the closest distances between closest basket members multiplied by the average longitudinal distance of the sidewalls of open mesh construction in said bed of solid elements is at least about 0.75 ft.$^2$.

2. The apparatus of claim 1 wherein the cross-sectional area of the top opening of each basket member is at least about 0.5 in.$^2$.

3. The apparatus of claim 2 wherein the openings in the mesh comprise from about 20% to about 85% of the area encompassed by said open mesh construction.

4. The apparatus of claim 3 wherein one-half the average of the closest distances between closest basket members multiplied by the average longitudinal distance of the side walls of open mesh construction in said bed of solid elements is in the range from about 1.0 ft.$^2$ to about 10 ft.$^2$.

5. The apparatus of claim 4 wherein the cross-sectional area of the top opening of each basket member is in the range from about 1 in.$^2$ to about 600 in.$^2$.

6. The apparatus of claim 5 wherein each said basket member is cylindrical in configuration.

7. The apparatus of claim 6 wherein the bottom wall of each said basket member is of open mesh construction.

8. The apparatus of claim 6 wherein said basket members are substantially equidistantly spaced across the cross-section of said bed of solid elements and the openings in the mesh comprise from about 40% to about 85% of the area encompassed by said open mesh construction.

9. The apparatus of claim 5 wherein one-half the average of the closest distance between closest basket members multiplied by the average longitudinal distance of the side walls of open mesh construction in said bed of solid elements is in the range from about 1.2 ft.$^2$ to about 4.0 ft.$^2$.

10. The apparatus of claim 9 wherein each said basket member is cylindrical in configuration.

11. The apparatus of claim 10 wherein the bottom wall of each said basket member is of open mesh construction.

12. The apparatus of claim 10 wherein said basket members are substantially equidistantly spaced across the cross-section of said bed of solid elements and the openings in the mesh comprise from about 40% to about 85% of the area encompassed by said open mesh construction.

13. A method for removing particulate impurities from a fluid stream flowing into a bed of discrete solid elements comprising conveying said fluid stream toward a surface of said bed having disposed therein the apparatus of claim 1.

14. A method for removing particulate impurities from a fluid stream flowing into a bed of discrete solid elements comprising conveying said fluid stream toward a surface of said bed having disposed therein the apparatus of claim 3.

15. A method for removing particulate impurities from a fluid stream flowing into a bed of discrete solid elements comprising conveying said fluid stream toward a surface of said bed having disposed therein the apparatus of claim 5.

16. A method for removing particulate matter from a fluid stream comprising a liquid-vapor mixture flowing into a bed of discrete solid elements comprising conveying said fluid stream toward a surface of said bed having disposed therein the apparatus of claim 6.

17. A method for removing particulate matter from a fluid stream comprising a liquid-vapor mixture flowing into a bed of discrete solid elements comprising conveying said fluid stream toward a surface of said bed having disposed therein the apparatus of claim 8.

18. A method for removing particulate matter from a fluid stream comprising a liquid-vapor mixture flowing into a bed of discrete solid elements comprising conveying said fluid stream toward a surface of said bed having disposed therein the apparatus of claim 9.

19. A method for removing particulate matter from a fluid stream comprising a liquid-vapor mixture flowing into a bed of discrete solid elements comprising conveying said fluid stream toward a surface of said bed having disposed therein the apparatus of claim 12.

* * * * *